UNITED STATES PATENT OFFICE.

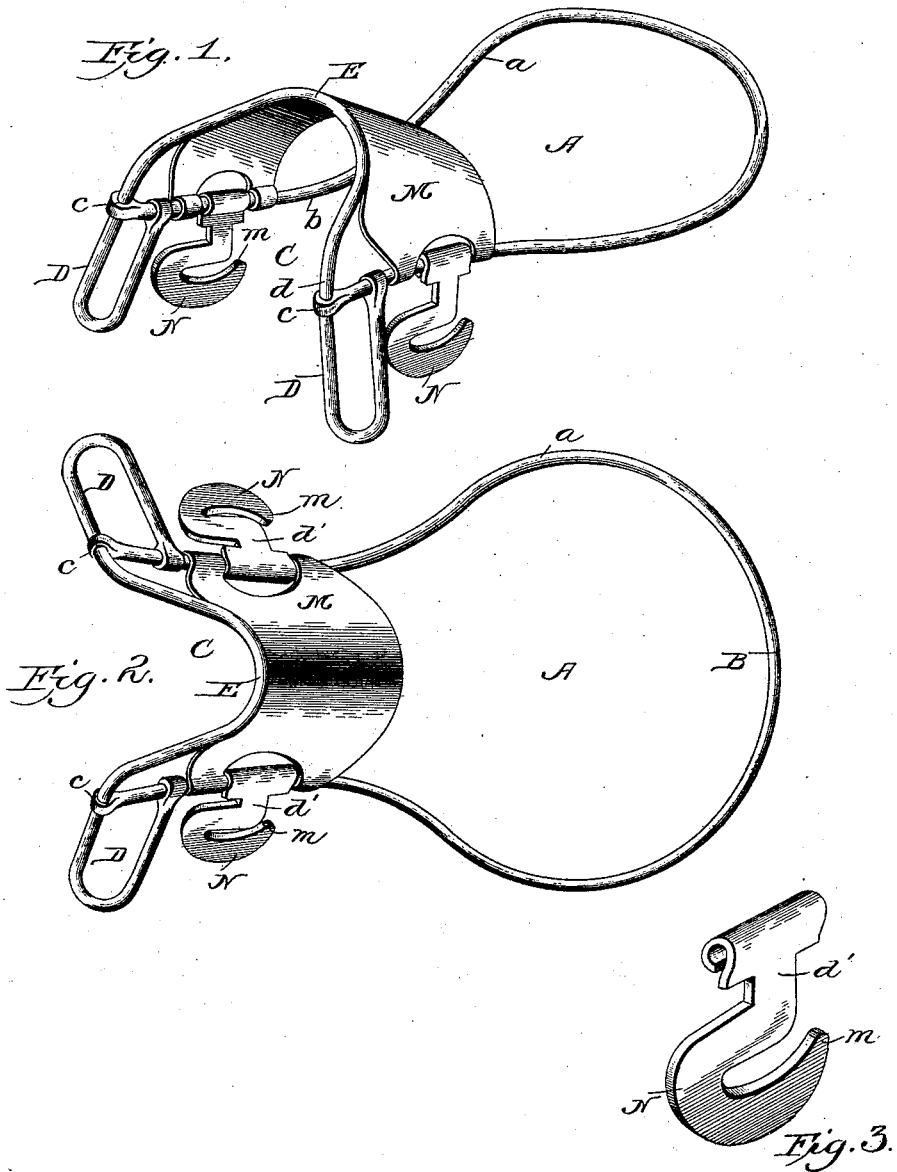

RICHARD C. BARRY, OF MONTREAL, CANADA.

SADDLE-TREE.

SPECIFICATION forming part of Letters Patent No. 483,037, dated September 20, 1892.

Application filed April 2, 1892. Serial No. 427,540. (No model.)

*To all whom it may concern:*

Be it known that I, RICHARD C. BARRY, a citizen of Canada, residing at Montreal, in the Province of Quebec, Canada, have invented certain new and useful Improvements in Saddle-Trees; and I do hereby declare the following to be a full, clear, and exact description of the invention, such as will enable others skilled in the art to which it appertains to make and use the same.

My invention has relation to improvements in saddle-trees; and it has for its general object to provide a strong, durable, and light tree adapted to conform to and comfortably rest upon a horse's back and afford a springy comfortable seat for the rider.

A further object of the invention is to provide a saddle-tree of such construction that its forward portion will straddle the back of the animal and rest firmly against its withers, whereby casual lateral slipping of the saddle, and consequently chafing of the animal's back, is effectually prevented.

A still further object of the invention is to provide such a means for the connection of the stirrup-straps to the tree that when a rearward draft is exerted upon said straps they will be disconnected from the tree and saddle.

To the attainment of the foregoing and other objects the invention consists in the peculiar construction, certain novel combinations, and the adaptation of parts hereinafter described, and particularly pointed out in the claim appended.

In the accompanying drawings, Figure 1 is a perspective view of my improved saddle-tree complete. Fig. 2 is a top plan view of the same, and Fig. 3 is a detail perspective view of one of the hooks through the medium of which the stirrup-straps are connected to the tree and saddle.

In the said drawings similar letters designate corresponding parts throughout the several views, referring to which—

A indicates the body-skeleton of my improved tree, which is formed from a single spring-wire *a*, as illustrated. In the construction of the tree this wire *a* is first bent to form the approximately circular seat B, and its branches are brought comparatively close together, as at *b*, after which they are slightly flared forwardly and outwardly, as shown, to form the neck C and comfortably receive the withers of an animal between them. Fixedly connected at one end to the wire *a*, adjacent to the ends thereof, which are bent into hooks or eyes *c*, as illustrated, are the ends of a wire *d*, which is seated and fixedly secured in the said hooks *c* and is bent to form the depending vertically-oblique leg-loops D, which rest against the withers of an animal, and the bridge-loop E, which is pitched rearwardly, as illustrated, and serves to rigidly connect the end branches of the wire *a*. Fixedly connected at its ends to the end branches of the wire *a*, immediately in rear of the bridge-loop E, is a broad arched gullet M, which is preferably formed of spring-steel and not only serves to materially strengthen the tree, but renders the same more comfortable to the horse.

The gullet M is cut away adjacent to the end branches of the wire *a* to permit of the connection to said branches of the depending shanks *d'* of the strap-hooks N, which are bent, as illustrated, to form the horizontal loop and have their free ends *m* bent or carried upwardly, approximately as shown, to prevent the casual disconnection of the stirrup-strap.

By connecting the stirrup-straps to the tree and saddle through the medium of the hooks N, as illustrated in Fig. 1 of the drawings, it will be readily perceived that should the rider fall or be thrown off and his foot hang in the stirrup a rearward draft upon the stirrup-strap will be exerted and said strap will be pulled off its hook, whereby injury to the rider incidental to being dragged over the ground, will be prevented.

By reason of the peculiar form and construction of the tree, as clearly pointed out, it will be readily perceived that not only will the same rest comfortably upon the back of an animal and afford a comfortable springy seat for the rider, but will so straddle and fit the animal's back that the chances of its slipping or moving laterally are reduced to a minimum.

Although I prefer to employ wire in the construction of my improved tree, as illustrated and described, I do not desire to be confined to the same, as light tubular steel or equivalent material might be employed for the purpose.

Having thus described my invention, what I claim, and desire to secure by Letters Patent, is—

A saddle-tree consisting of the body portion with forwardly-extending branches formed of a single piece of wire and having a bridge-loop with integral leg-loops secured to the ends of the branches, an arched gullet connected to said branches, and the hinged strap-hooks interposed between the connected ends of said gullet, substantially as and for the purposes specified.

In testimony whereof I affix my signature in presence of two witnesses.

RICHARD C. BARRY.

Witnesses:
D. S. BILANGES,
Ls. N. DUMOUCHEL.
*Of Montreal.*